United States Patent
Dotson et al.

(10) Patent No.: US 7,644,295 B1
(45) Date of Patent: Jan. 5, 2010

(54) POWERING A HUMAN MACHINE INTERFACE BY WAY OF USB

(75) Inventors: Gary Dan Dotson, Muskego, WI (US); Clinton Duane Britt, Milwaukee, WI (US); Joseph Francis Mann, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 438 days.

(21) Appl. No.: 11/426,545

(22) Filed: Jun. 26, 2006

(51) Int. Cl.
*G05B 11/00* (2006.01)
*G05B 13/02* (2006.01)
*G06F 19/00* (2006.01)

(52) U.S. Cl. .................. 713/340; 713/324; 700/17; 700/12; 700/40

(58) Field of Classification Search ............... 713/340, 713/324; 700/17, 12, 40
See application file for complete search history.

(56) References Cited

U.S. PATENT DOCUMENTS

| | | | |
|---|---|---|---|
| 5,511,205 A * | 4/1996 | Kannan et al. ............. 713/324 |
| 6,016,476 A * | 1/2000 | Maes et al. ................ 705/1 |
| 6,167,464 A | 12/2000 | Kretschmann |
| 6,516,418 B1 * | 2/2003 | Lee .......................... 713/320 |
| 6,526,516 B1 * | 2/2003 | Ishikawa et al. ........... 713/340 |
| 6,545,416 B1 | 4/2003 | Fisher et al. |
| 6,574,740 B1 * | 6/2003 | Odaohhara et al. ........ 713/323 |
| 6,633,932 B1 * | 10/2003 | Bork et al. ................ 710/72 |
| 6,668,296 B1 * | 12/2003 | Dougherty et al. ........ 710/303 |
| 6,714,016 B2 * | 3/2004 | Odaohhara et al. ........ 324/427 |
| 6,717,382 B2 | 4/2004 | Graiger et al. |
| 6,735,671 B1 * | 5/2004 | Kida .......................... 711/111 |
| 6,892,147 B2 * | 5/2005 | Bui et al. ................. 702/63 |
| 6,894,463 B2 * | 5/2005 | Kernahan ................. 323/267 |
| 6,898,645 B2 | 5/2005 | Abujbara |
| 6,987,334 B2 * | 1/2006 | Koehler ................... 307/140 |
| 7,032,015 B1 | 4/2006 | Delandro et al. |
| 7,036,025 B2 * | 4/2006 | Hunter ...................... 713/300 |
| 7,043,310 B2 | 5/2006 | Polz et al. |
| 7,043,316 B2 | 5/2006 | Farchmin et al. |
| 7,296,171 B2 * | 11/2007 | Hahn et al. ................ 713/324 |
| 7,343,506 B1 * | 3/2008 | Fenwick ................... 713/340 |
| 7,383,451 B2 * | 6/2008 | Matsushima et al. ....... 713/300 |
| 7,430,679 B2 * | 9/2008 | Tevanian, Jr. ............. 713/324 |
| 2002/0083025 A1 * | 6/2002 | Robarts et al. ............. 706/12 |
| 2003/0120714 A1 * | 6/2003 | Wolff et al. ............... 709/200 |
| 2004/0203846 A1 * | 10/2004 | Caronni et al. .......... 455/456.1 |
| 2006/0267940 A1 * | 11/2006 | Groom et al. ............. 345/163 |
| 2008/0250261 A1 * | 10/2008 | Nguyen et al. ............ 713/340 |
| 2009/0094473 A1 * | 4/2009 | Mizutani ................... 713/340 |

OTHER PUBLICATIONS

"Power Management in Windows XP", Charlie Russel, Microsoft. Mar. 25, 2002.*

(Continued)

*Primary Examiner*—Michael D Masinick
(74) *Attorney, Agent, or Firm*—Turocy & Watson LLP; Alexander R. Kuszewski

(57) ABSTRACT

A human machine interface (HMI) device comprises a power recognition component that determines at least one power source that is providing power to the HMI device, wherein the at least one power source is one of a host device providing power by way of a Universal Serial Bus connection, an AC power source, a DC power source, and a battery. A selector component can automatically select a subset of functionalities to enable with respect to the HMI from amongst several possible functionalities based at least in part upon the at least one determined power source.

21 Claims, 12 Drawing Sheets

OTHER PUBLICATIONS

"Windows 98 Power Mangement on ThinkPad Notebooks", Jun. 1998, Information Brief.*

"Charging Batteries using USB Power", Application Note 3241, Maxim, May 25, 2004.*

* cited by examiner

POWERING A HUMAN MACHINE INTERFACE BY WAY OF USB

TECHNICAL FIELD

The claimed subject matter relates generally to industrial environments and, more particularly, to providing power to a human-machine interface (HMI) by way of a universal serial bus (USB).

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, activities that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases (or web services referencing databases) that are accessible by system/process/project managers on a factory floor. For instance, sensors and associated software can detect a number of instances that a particular machine has completed an operation given a defined amount of time. Further, data from sensors can be delivered to a processing unit related to system alarms. Thus, a factory automation system can review collected data and automatically and/or semi-automatically schedule maintenance of a device, replacement of a device, and other various procedures that relate to automating a process.

To quickly and easily effectuate control of a system or process within industrial automation environments, equipment manufacturers typically create specialized human-machine interfaces (HMIs) that are employed by operators to deliver commands to industrial systems/processes and/or receive data from industrial systems/processes. In other words, HMIs provide an essential communication link between operators and automation devices, wherein such HMIs enable operators to, among other things, implement and control devices and receive feedback by monitoring device status and health during operation. Without these interfaces, high-level industrial automation would be difficult if not impossible to achieve.

Over time, HMIs have undergone several and drastic changes. For instance, a push-button that commissions and de-commissions a machine is a simplest form of a HMI, and these interfaces have been existent for several years. Terminals were later designed that displayed text messages to end users, wherein such messages are indicative of a process performed by a server or processor associated with an automation device. For example, a failed device can generate an internal error code representing a determined error which can then be matched with a particular error message. This message can thereafter be displayed to an operator on a display device. Development of client-side processing has enabled graphical depictions of status and control commands to operators, which has shifted a burden from an automated device or associated processor to a client-side graphical user interface. These graphical user interfaces improve an ability of users to access information quickly and easily.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The claimed subject matter relates to selectively enabling functionality associated with a human machine interface (HMI) based upon an identification of one or more power sources that are providing power to the HMI. For instance, the HMI can be a portable HMI, an HMI that is designed for permanent installation, and/or any other suitable HMI. For example, if it is determined that the HMI is being provided power from a host device by way of a USB connection, the HMI can be configured to act as a storage class device. Therefore, power can be provided to a CPU/memory subsystem (to enable the HMI to act as a storage class device) but not provided to a backlight. Such configuration of the HMI as a storage class device enables the HMI to be quickly and easily configured (e.g., through USB) without requiring the HMI to be coupled to an external power source or a network. In another example, if it is determined that an HMI is being powered by way of USB, then the HMI can be configured to act as a web server (serving up web pages to a host device). Thus, the HMI can be configured based upon a determined source of power.

In another example, if it is detected that power is being provided from two different power sources at a particular instance in time, the HMI can be configured to act in a certain manner. For instance, if the HMI is being powered by way of an AC outlet and is then connected to a host device by way of USB, then maintenance functionality can be provided to the user. Therefore, the HMI can be provided with different "personalities" depending upon one or more source(s) of power associated with the portable HMI.

Additionally, a manner in which the HMI is configured can be based at least in part upon factors in addition to detected power source. For example, an HMI can be configured differently for disparate users when the HMI is coupled to different power sources. Moreover, context can be taken into account, such that different functionality can be provided with respect to an HMI given different power source(s) and context. Thus, various levels of granularity are contemplated in connection with determining a "personality" to provide to the HMI.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
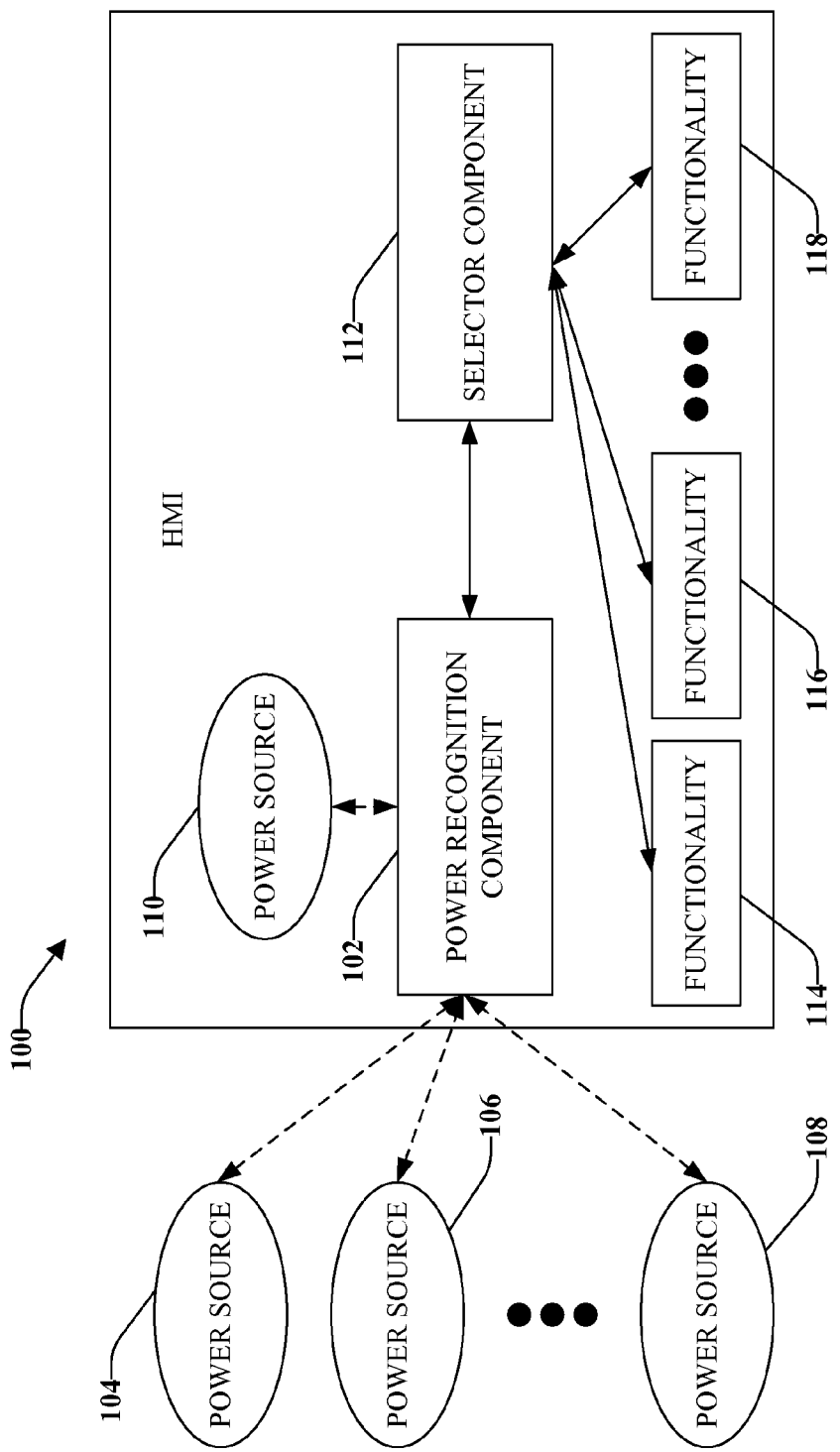
FIG. 1 is a high level block diagram of a system that facilitates configuration of an HMI device based at least in part upon a source of power with respect to the HMI.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Of course, those skilled in the art will recognize many modifications may be made to this configuration without departing from the scope or spirit of what is described herein.

Now referring to the drawings, FIG. 1 illustrates a human machine interface (HMI) 100 that can be utilized in connection with operating industrial equipment, collecting and analyzing data relating to industrial equipment, and the like. For instance, the HMI 100 can be a portable HMI, which may be of a size similar to a portable telephone, personal digital assistant, or other well-known portable devices. In another example, the HMI 100 can be an HMI that is configured for permanent installation. The HMI 100 can include a power recognition component 102 that can determine one or more possible sources of power that are currently providing power to the HMI 100. For example, several power sources 104-110 can provide power to the HMI 100. For instance, the power source 104 can be an AC power source, the power source 106 can be a DC power source, the power source 108 can be a host device that provides power to the portable HMI 100 through a Universal Serial Bus (USB), and the power source 110 can be an internal power source such as a battery, a super capacitor, or other suitable power source. It is understood, however, that the portable HMI 100 may not require an internal power source to properly function, and other power sources are contemplated, such as a logic controller or other suitable industrial device, a powered hub (where a host is limited in an amount of current available), etc.

The power recognition component 102 can utilize any suitable hardware and/or software in connection with determining one or more sources of power with respect to the HMI 100 (e.g., the HMI may simultaneously be associated with different power sources). This can be accomplished through analyzing and recognizing properties related to the power source(s) 104-110. For instance, the power recognition component 102 can monitor a USB connector to determine whether power is being provided to the HMI 100. In another example, the power recognition component 102 can monitor a power supply to determine that power is being provided by way of an AC power source. Moreover, as stated above, the power recognition component 102 can determine that two different sources of power are concurrently coupled to the HMI 100.

The power recognition component 102 can inform a selector component 112 of power source(s) that are currently associated with the HMI 100. The selector component 112 can then automatically or semi-automatically enable functionality that can be provided by the HMI 100. For example, the HMI 100 can be associated with several different "personalities" which can be enabled given various functionalities 114-118 that the HMI 100 is capable of supporting. For example, the functionality 114 can be associated with a backlight for a graphical user interface (GUI), the functionality 116 can relate to operating the HMI 100 as a remote web server, and the functionality 118 can relate to configuring an HMI application.

Thus, the HMI 100 can take on different "personalities" based at least in part upon a power source associated therewith. More particularly, for example, if the power recognition component 102 detects that power is solely being provided by way of USB (e.g., USB 1.1, USB2.0, USBOTG (at any speed)), then the selector component 112 can, for instance, enable the HMI 100 to act as a remote server (e.g., enable the functionality 116) but not enable backlighting functionality. In another example, if the power recognition component 102 recognizes that power is being supplied by way of an AC power source, then the selector component 112 can enable all functionalities associated with the HMI 100. In still another example, the power recognition component 102 can detect that the HMI 100 includes a full battery charge (and is thus receiving power from the internal power source 110) and is also coupled to a host by way of USB. The selector component 112 can then select one or more functionalities based at least in part upon such determination. Therefore, the HMI 100 can provide different functionalities to a user depending upon currently connected source(s) of power associated with the HMI 100.

Figure 2:
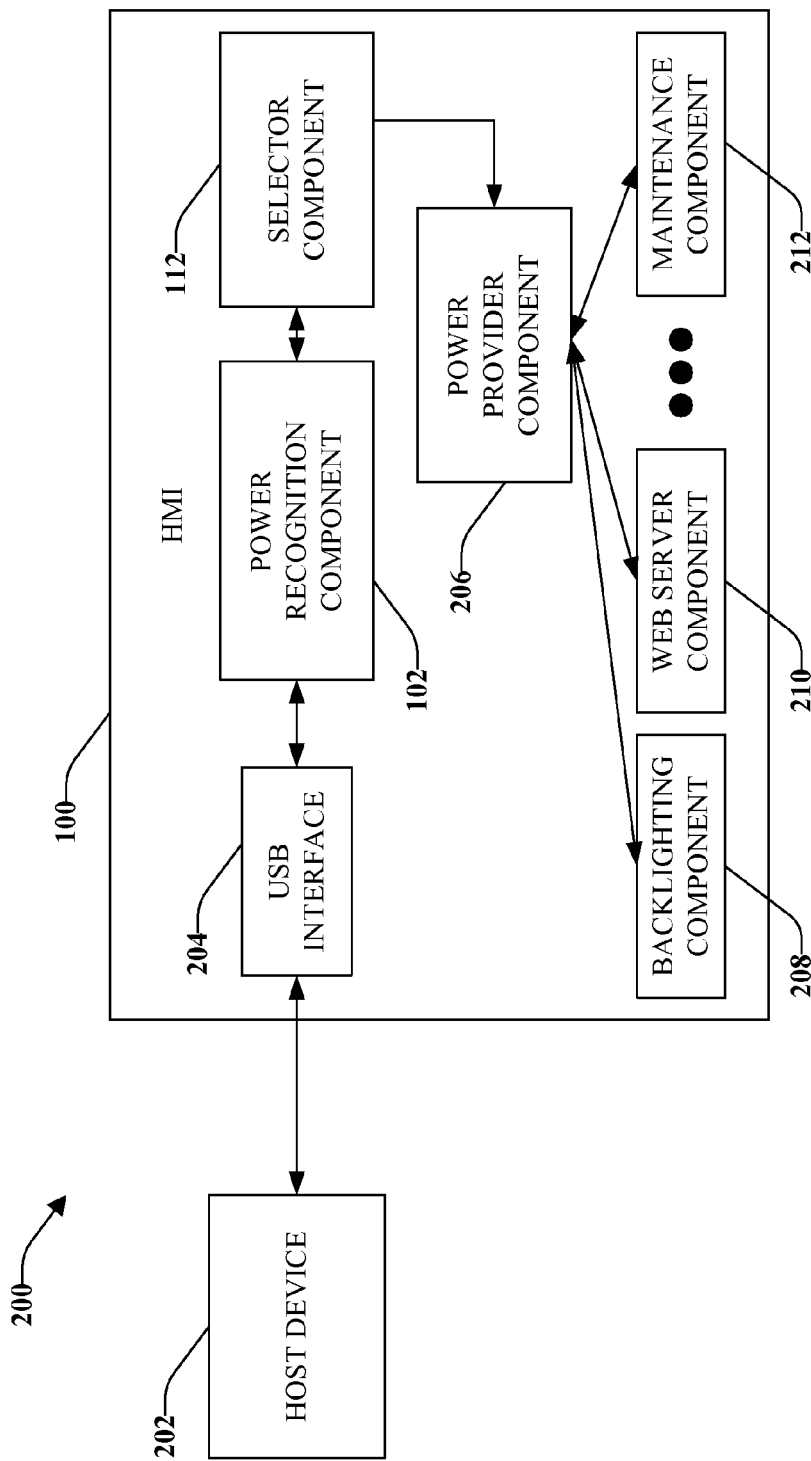
FIG. 2 illustrates a system for automatically selecting functionality associated with an HMI device based at least in part upon a source of power with respect to the HMI.

Now referring to FIG. 2, a system 200 is illustrated that facilitates associating the HMI 100 with limited functionality when it is powered by way of USB. The system 200 includes a host device 202 that hosts the HMI 100. The host device 202 can be, for instance, a PDA, a laptop computer, a desktop computer, a powered hub, an industrial device, or any other suitable device that is associated with USB capabilities. The HMI 100 includes a USB interface 204 that enables the HMI 100 to interface to the host device 202 by way of USB. For example, the USB interface 204 can be or include a port, USB-related hardware and/or software that facilitates traversal of power from the host device 202 to the USB interface 204.

The HMI 100 additionally includes the power recognition component 102 that can recognize that power is being provided to the HMI 100 by way of USB from the host device 202 (and no other power source). The power recognition component 102 can then inform the selector component 112 of the source of power for the HMI 100. The selector component 112 can select one or more functionalities that the HMI 100 is capable of performing. Additionally, the power recognition component 102 and/or the selector component 112 can negotiate for additional power from the host device 202 (above the standard 0.5 amperes at 5 volts). For instance, the power recognition component 102 and/or the selector component 112 can negotiate 5 amps without exceeding internal ratings if desired.

A power provider component 206 can then selectively provide power to functionalities selected by the selector component 112 while withholding power from functionalities not selected by the selector component 112. For example, the power provider component 206 can provide power to a backlighting component 208 and a web server component 210 but refrain from providing power to a maintenance component 212. For instance, the backlighting component 208 can be operable to provide backlighting to the portable HMI 100, the web server component 210 can be used to serve web pages to the host device 202, and the maintenance component 212 can be operable to provide maintenance services with respect to the portable HMI 100 (e.g., installing applications, reconfiguring an application, . . . ). Providing power to the backlighting component 208 may be desirable only in situations where ambient light is below a threshold—thus, while not shown, the power provider component 206 can utilize contextual data to determine which functionalities to enable within the HMI. When the HMI 100 is powered by an AC power source, for example, each of the functionalities 208-212 can be enabled. Moreover, different or additional functionalities can be enabled when different power sources are concurrently associated with the portable HMI 100. Thus, the HMI 100 can take on different "personalities" depending upon power source(s) detected by the power recognition component 102.

Figure 3:
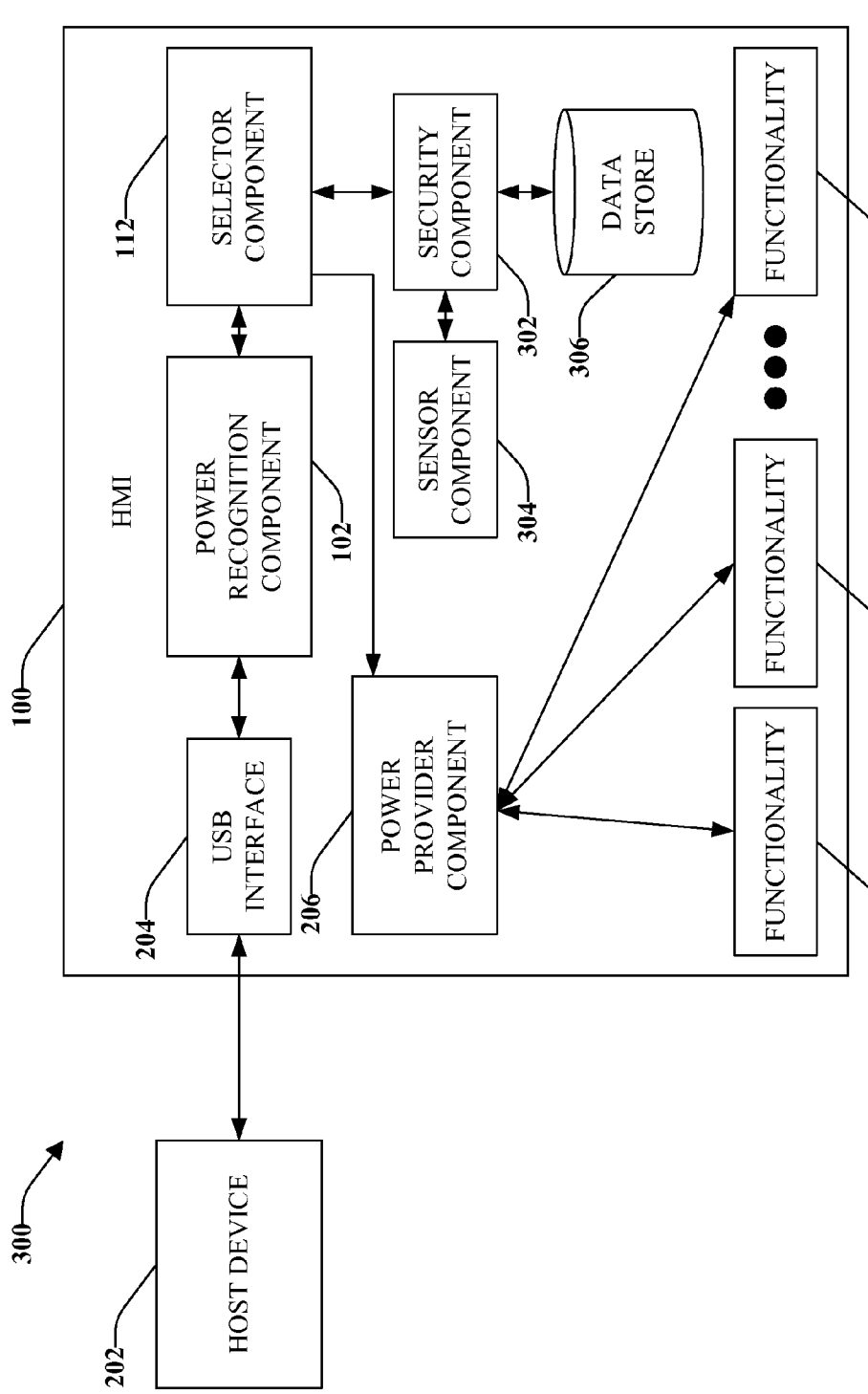
FIG. 3 illustrates a system that facilitates configuring an HMI device based at least in part upon user identity, role, and/or context.

Turning now to FIG. 3, a system 300 that facilitates selective provision of power to particular portion(s) of the HMI 100 is illustrated. The system 300 includes the host device 202 that is communicatively coupled to the HMI 100 by way of USB. In more detail, the host device 202 can provide power to the HMI 100 by way of the USB interface 204. The power recognition component 102 can recognize that power is being provided to the HMI 100 by way of USB, and can relay such recognition to the selector component 112.

The selector component 112 can be associated with a security component 302, which can provide information relating to user rights and privileges to the selector component 112. For example, the security component 302 can determine a user's identity through, for instance, receipt and analysis of a username, password, biometric indicia, such as voice data, fingerprint information, etc. Additionally, the security component 302 can determine user identity through use of a digital signature, public/private key pair, or other suitable security measures. The security component 302 can also receive data from a sensor component 304 that can determine contextual data associated with the HMI 100 and/or a user thereof. For instance, the sensor component 304 can sense parameters such as time of day, day of week, time of year, approximate geographic location of the HMI 100 (e.g., through use of GPS, triangulation, . . . ), physical orientation of the portable HMI 100, amount of ambient light in a particular location, and/or other suitable contextual data.

Upon receipt of such data (or based upon user identity alone), the security component 302 can access a data store 306 that retains an index of user roles given certain user identity and contextual data. For example, a plant manager may have different rights with respect to certain available functionalities on the HMI 100 when such HMI 100 is powered by way of USB when compared with an individual who works in accounting. In another example, an operator associated with a first process may have access to and/or desire different functionality on the HMI than an operator associated with a second process. In still another example, a user can change orientation of the HMI 100 and be provided with different functionalities (which can also depend upon user role).

The security component 302 can then provide access rights/privileges associated with a user and/or sensed contextual data to the selector component 112. Thus, the HMI 100 can offer different functionality depending upon user identity, user role, contextual data, and sensed power supply. Moreover, a particular user can provide preferences that can be retained within the data store 306 and utilized by the selector component 112 when a user attempts to access the HMI 100. While shown as being retained within the HMI 100, it is understood that in some instances the security component 302, the sensor component 304, and/or the data store 306 can reside in another device, such as the host 202.

Once the selector component 112 receives the recognized power source(s) and access rights/preferences from the security component 302, the selector component 112 can determine which of several functionalities 308-312 the HMI 100 is capable of offering to provide to a user. In an example, when power is provided by way of USB to the HMI 100, enabling each of the functionalities 308-312 may not be possible (due to lack of sufficient power). This determination can then be provided to the power component 206, which selectively provides power to one or more of the functionalities 308-312. In an example, the power provider component 206 can include various switches, such that, for instance, power can be provided to the functionality 308 while not being provided to the functionality 310. For instance, the power provider component 206 can utilize a switch in connection with selectively providing power to a function. For example, the switch can be a p-channel FET, a MOSFET, a relay, a MEMs device, any other suitable transistor, etc. Additionally or alternatively, a power ORing device (e.g., two power diodes) can be employed to draw current from an AC power source, a USB power source, or other power source.

Figure 4:
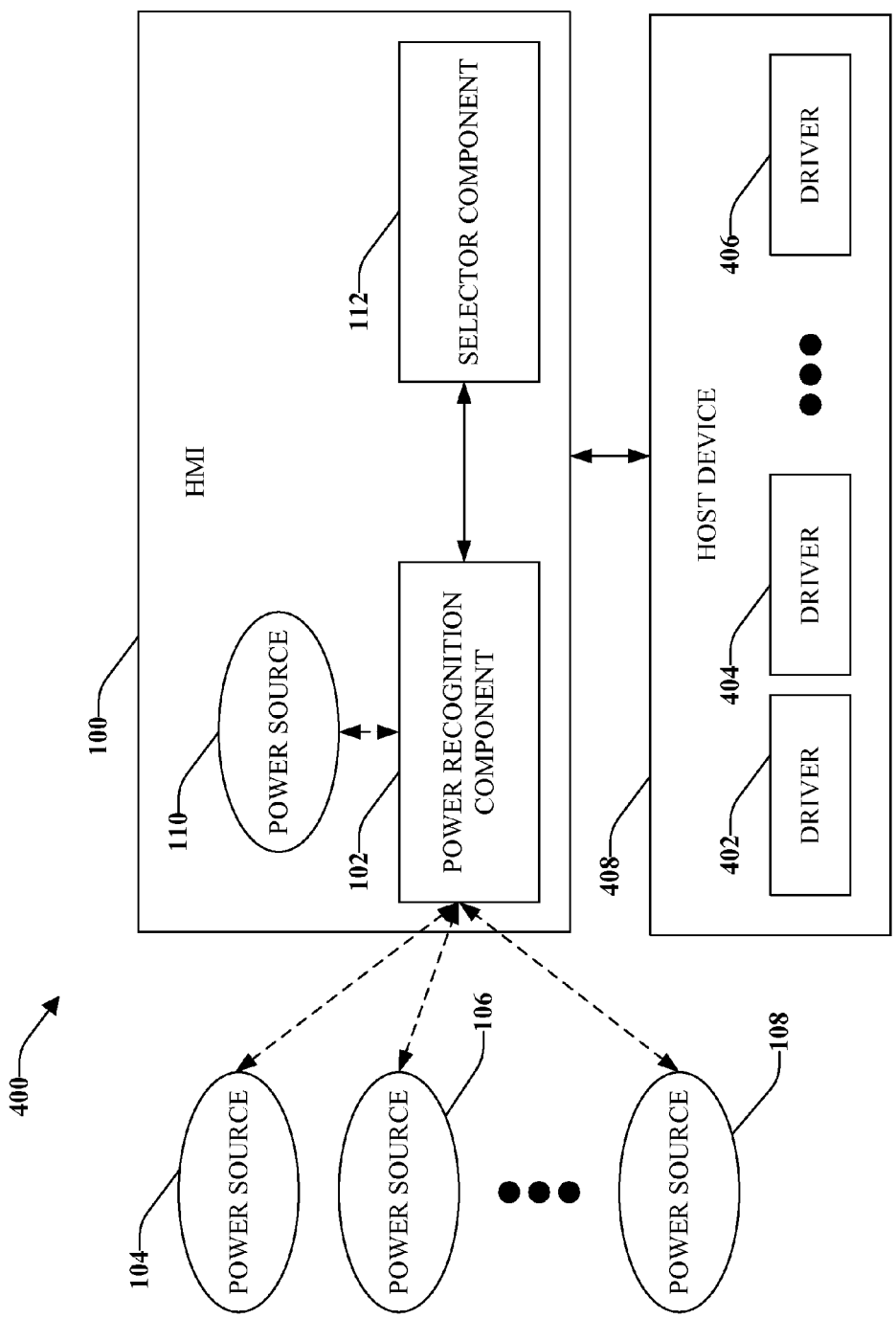
FIG. 4 illustrates system for automatically selecting a driver based upon a determined source of power associated with an HMI.

Referring now to FIG. 4, a system 400 that facilitates automatic configuration of the HMI 100 is illustrated. As described supra, the HMI 100 includes the power recognition component 102 that recognizes which of several available sources of power 104-110 are currently providing power to the HMI 100. This determination is passed to the selector component 112, which can automatically indicate that one of several available drivers 402-406 within a host device 408 can be initiated. In an example, the HMI 100 can be configured to act as a storage device when it is being powered by way of USB. Accordingly, if the power recognition component 102 determines that the sole source of power is by way of USB, then the selector component 112 can initiate a storage class driver (e.g., driver 400) within the host device 408. In another example, the HMI 100 can be configured to act as a remote web server when powered solely by way of USB. The power recognition component 102 can determine that the sole source of power is through USB and the selector component 112 can be used in connection with initiating a driver or drivers that enable the HMI 100 to act in a desired manner. Moreover, particular drivers can be selected when the HMI 100 is simultaneously receiving power from multiple power sources, such as by way of USB and an AC power source.

Figure 5:
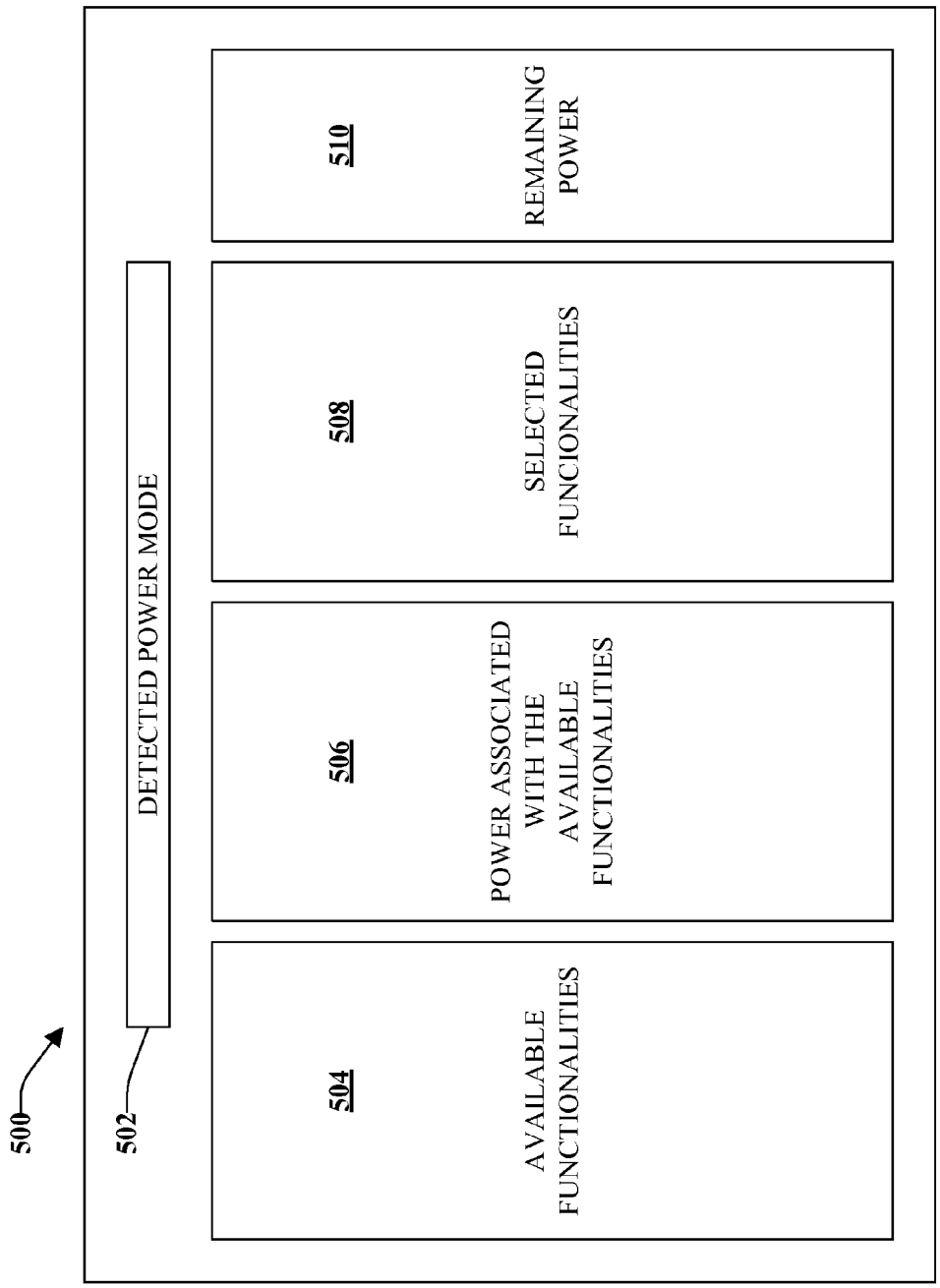
FIG. 5 illustrates an example user interface.

Now turning to FIG. 5, an example interface 500 that can be utilized to select one or more functionalities to enable on an HMI is illustrated. Such interface 500 can be displayed on a screen that is resident upon an HMI and/or upon a host device that hosts the HMI (e.g., a desktop computer, industrial device, . . . ). The interface 500 can include a field 502 that indicates that power is limited and that functionality may be limited. A field 504 can provide a list of available functionalities, including, for instance, backlighting, use of the HMI as a web server, use of the HMI as a storage device, etc. A field 506 can be used to associate functionalities with power required to enable such functionalities. For example, a backlight may require a threshold amount of power to provide adequate lighting of a GUI to a user. A field 508 can list functionalities selected by a user, and a field 510 can indicate an amount of remaining power. Thus, the interface 500 can be employed to enable a user to customize operation of an HMI when it is provided with power by way of USB, for example.

Turning to FIGS. 6-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
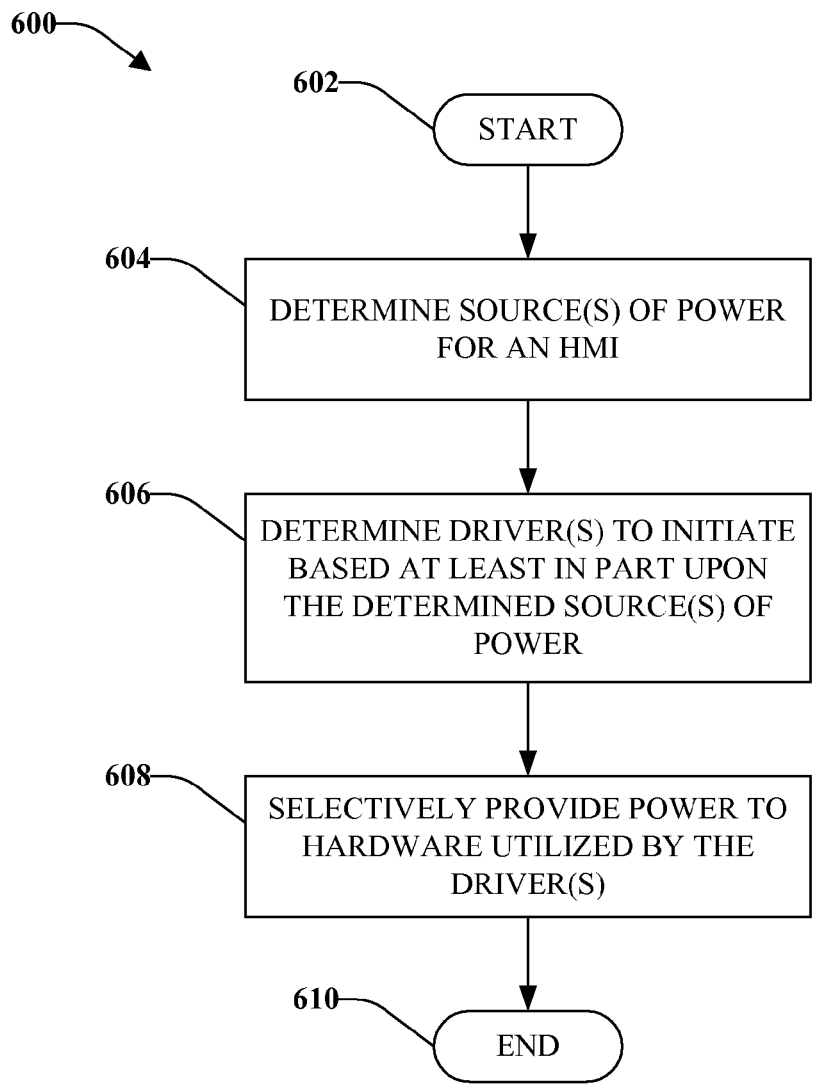
FIG. 6 is a representative flow diagram that illustrates a methodology for automatically configuring an HMI device.

Referring specifically to FIG. 6, a methodology 600 for selectively enabling functionality with respect to an HMI is illustrated. The methodology 600 starts at 602, and at 604 a source of power is determined with respect to an HMI. In an example, firmware within the HMI can detect that power is received by way of USB but additionally detect absence of a 5V power supply. Thus, it can be determined that the HMI is being powered solely by way of USB. In another example, multiple source(s) of power can be detected with respect to the HMI.

At 606, driver(s) that are desirably initiated with respect to the HMI are determined based at least in part upon the determined source(s) of power. For example, if it is determined that the HMI is being powered by way of USB, it may be desirable to initiate a storage class driver such that the HMI acts as a storage device. In another example, if it is determined that multiple source(s) of power exist with respect to the HMI, then a driver that can be used to cause the HMI to act as a remote web server can be initiated. At 608, power is selectively provided to hardware utilized by the driver(s) based at least in part upon the determined source(s) of power and/or the determined driver(s). For example, a switching mechanism can be employed in connection with such selective provision of power. The methodology 600 then completes at 610.

Figure 7:
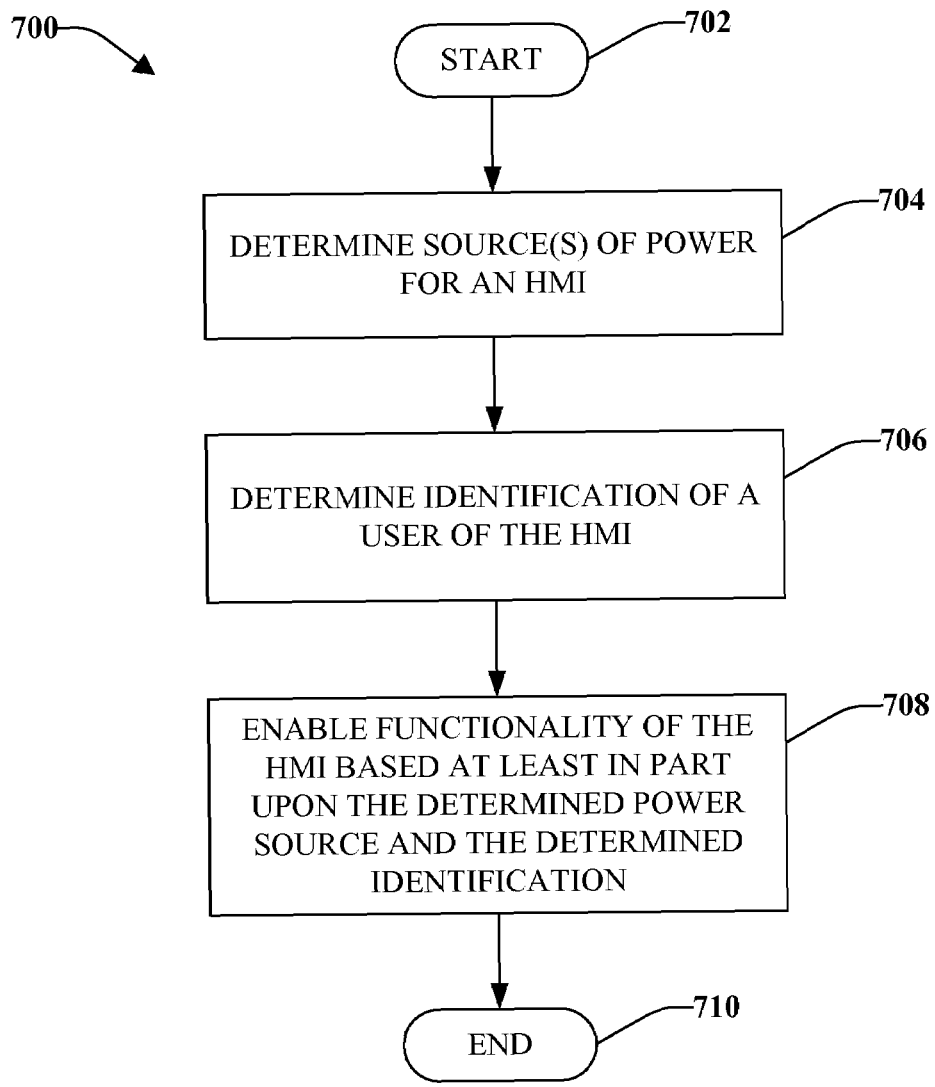
FIG. 7 is a representative flow diagram that illustrates a methodology for selecting certain functionality to associate with an HMI device.

With reference to FIG. 7, a methodology 700 for enabling particular functionality on an HMI device is illustrated. The methodology 700 starts at 702, and at 704 source(s) of power are determined with respect to an HMI (e.g., from amongst USB, AC, DC, battery, . . . ). At 706, identification of a user of the HMI device (or a host associated therewith) is determined. For example, such identification can be determined through an analysis of a username, password, personal identification number, public/private key pair, biometric indicia, and/or the like. At 708, functionality of the HMI is enabled based at least in part upon the determined power source and the determined identification. For example, the user may be associated with a particular role, and such role may be authorized to utilize certain functionality while restricted from utilizing other functionality. Additionally, current context, such as time of day, day of week, time of year, geographic location, orientation of the HMI, and the like can be considered when enabling certain functionality. The methodology 700 then completes at 710.

Figure 8:
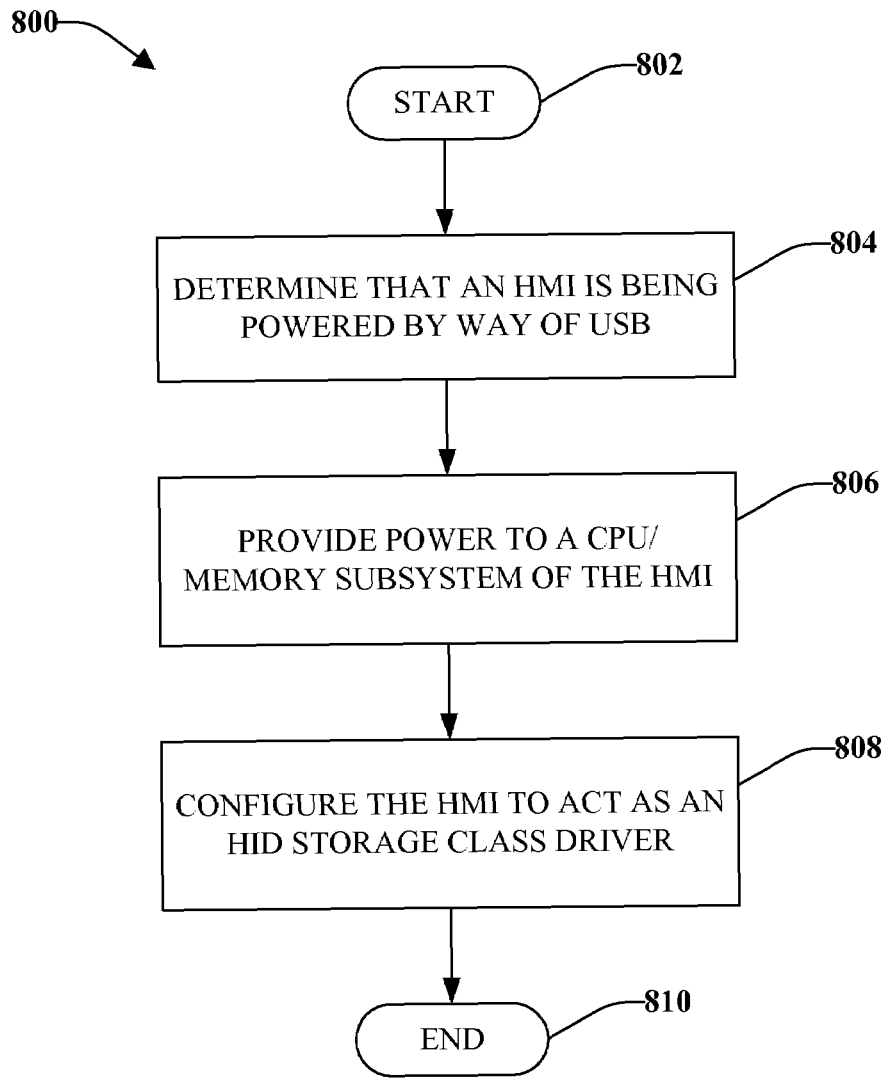
FIG. 8 is a representative flow diagram that illustrates a methodology for configuring an HMI device to act as a storage class device.

Now turning to FIG. 8, a methodology for configuring an HMI device to act as a storage class device is illustrated. The methodology 800 initiates at 802, and at 804 it is determined that an HMI is being powered by way of USB. For example, firmware can be employed to detect that the HMI is being powered solely by way of USB. At 806, power is provided to a CPU/memory subsystem of the HMI (and not, for example, to a backlight). At 808, the HMI is configured to act as an HID (human interface device) storage device. Therefore, for example, a laptop with a USB cable could be employed to quickly configure several HMI devices without having to connect the HMIs to a network or providing them with full power. Thus, the methodology 800 provides a simple manner for HMI configuring and loading.

While the methodology 800 describes configuring the HMI as a storage class device, it is understood that the methodology 800 can be slightly modified to configure the HMI in some other fashion. For example, the HMI can be configured to enable programming of the HMI (out of box), download configuration information, and enable updating of the HMI. The methodology 800 then completes at 810.

Figure 9:
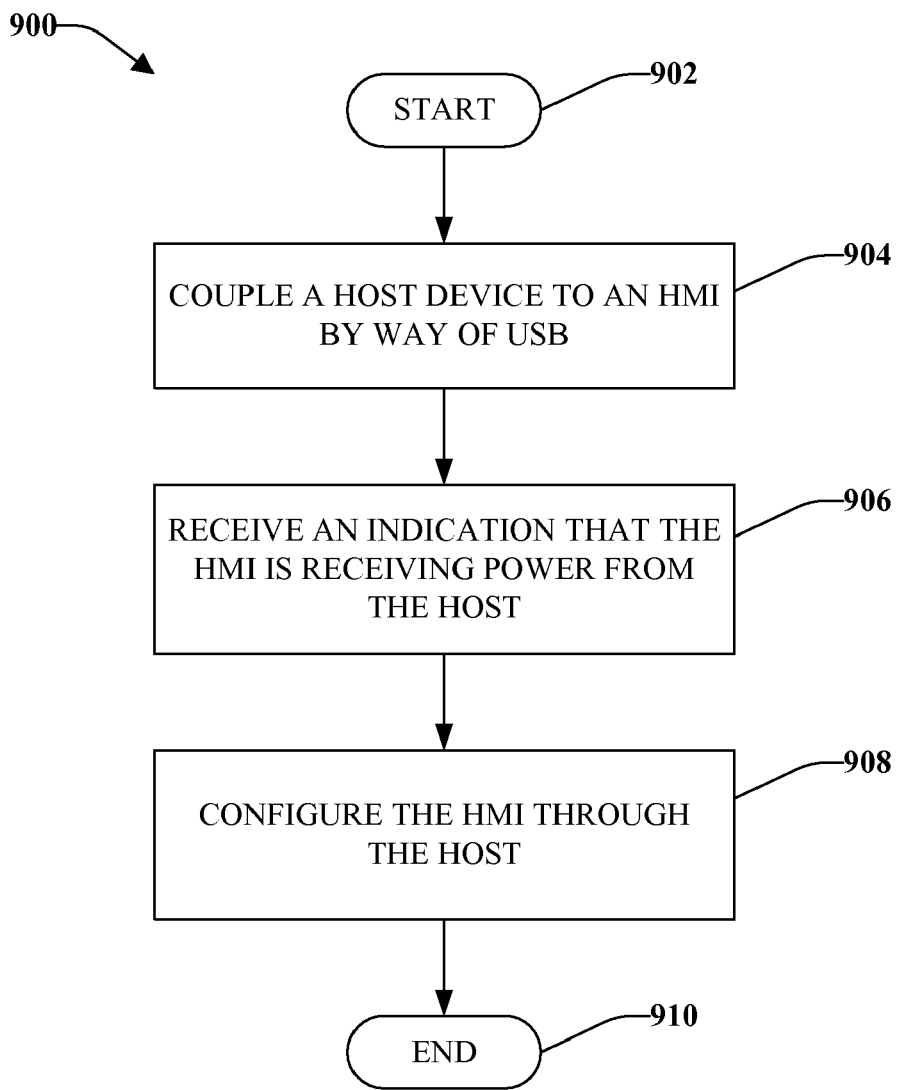
FIG. 9 is a representative flow diagram that illustrates a methodology for configuring an HMI device by way of a host device.

Referring now to FIG. 9, a methodology 900 for configuring an HMI through use of a host device (e.g., laptop PC, desktop PC, industrial device, . . . ) is illustrated. The methodology 900 starts at 902, and at 904 a host device is coupled to an HMI device by way of a USB connection. At 906, an indication that the HMI is receiving power from the host is received. For example, a light can be powered on at the HMI, an alarm can be generated at the host, and/or the like. At 908, the HMI is configured through the host. For instance, the HMI can be configured to act as a storage device, and the HMI can thus be configured through the host. The methodology 900 then completes at 910.

Figure 10:
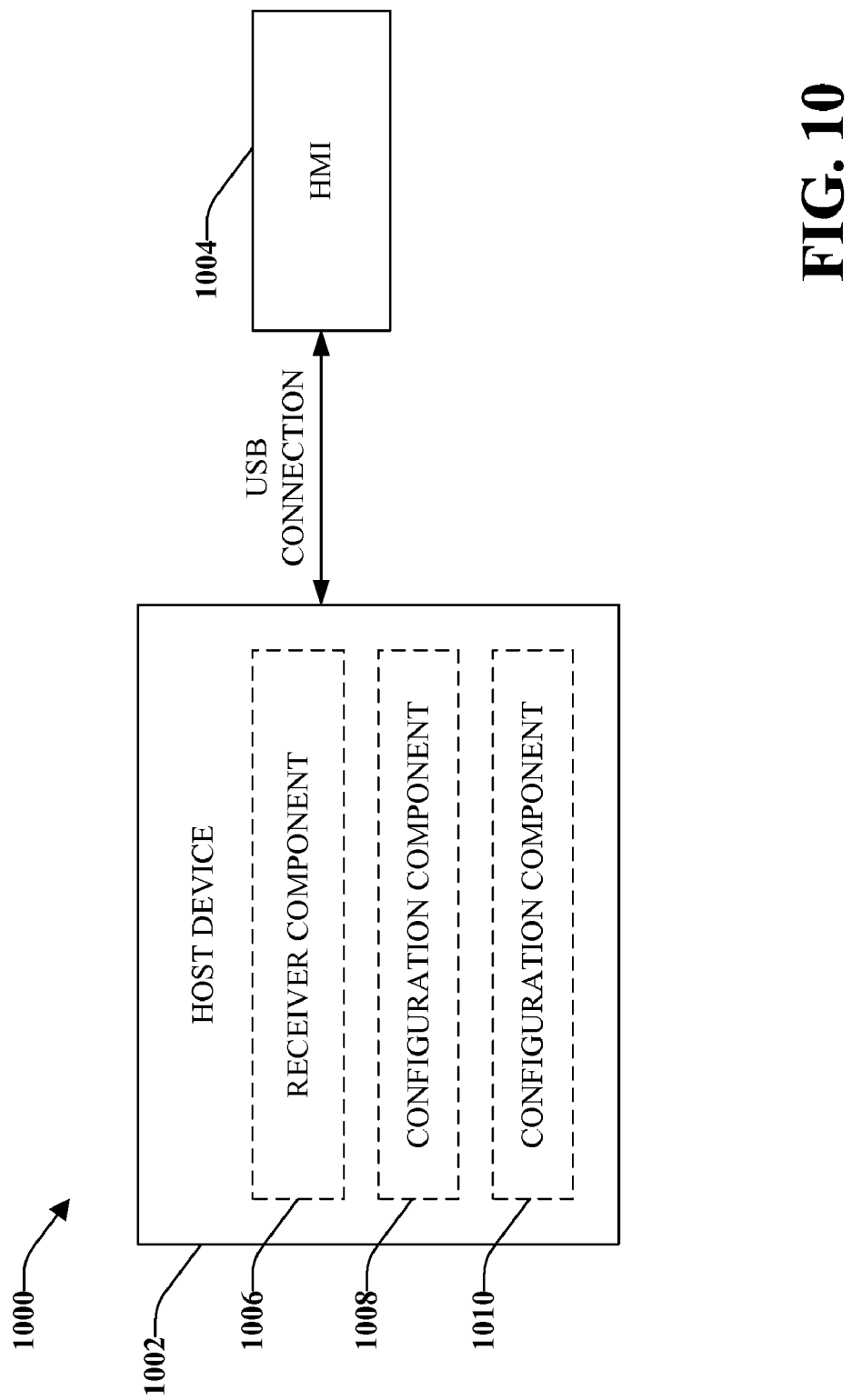
FIG. 10 is a block diagram of a system that facilitates configuring an HMI device by way of a host device.

Now turning to FIG. 10, a system 1000 that facilitates configuring an HMI device is illustrated. The system 1000 includes a host device 1002 that is communicatively coupled to an HMI 1004 by way of a USB connection 1006. The host device 1002 includes a receiver component 1006 that receives instructions to configure the HMI 1004. For instance, the instructions can be received from memory or a suitable data store (not shown) within the host device 1002. The receiver component 1006 is communicatively coupled to a configuration component 1008 that can configure the HMI according to the instructions. For example, the configuration component 1008 can configure the HMI 1004 as a storage class device. Additionally, the host device 1002 can include a driver initiation component 1010 that can initiate a storage class driver (to aid the configuration component 1008 in configuring the HMI 1004).

Figure 11:
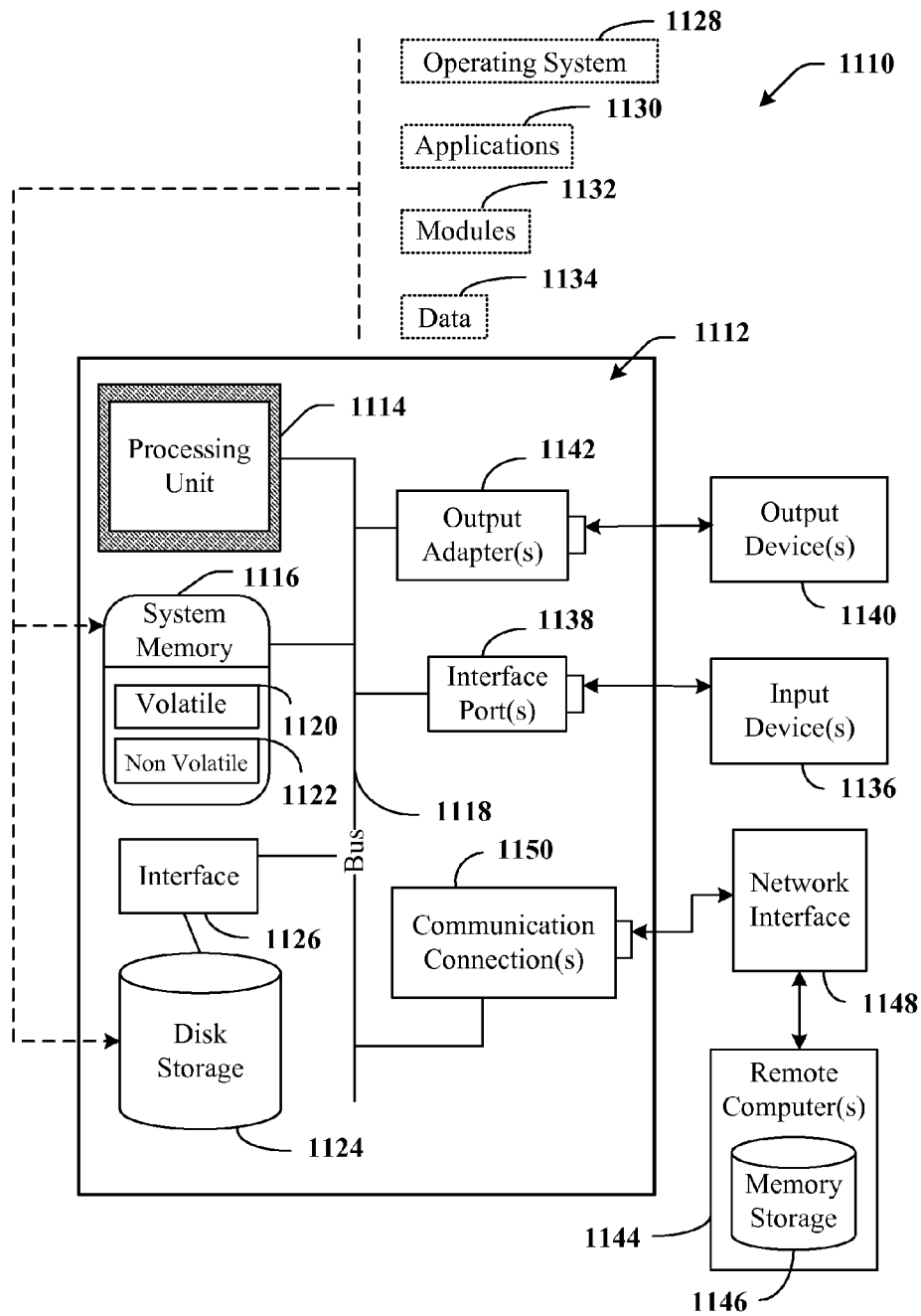
FIG. 11 is an example computing environment.

With reference to FIG. 11, an example environment 1110 for implementing various aspects of the claimed subject matter, including dynamically determining a sampling rate at which to sample data on a factory floor, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
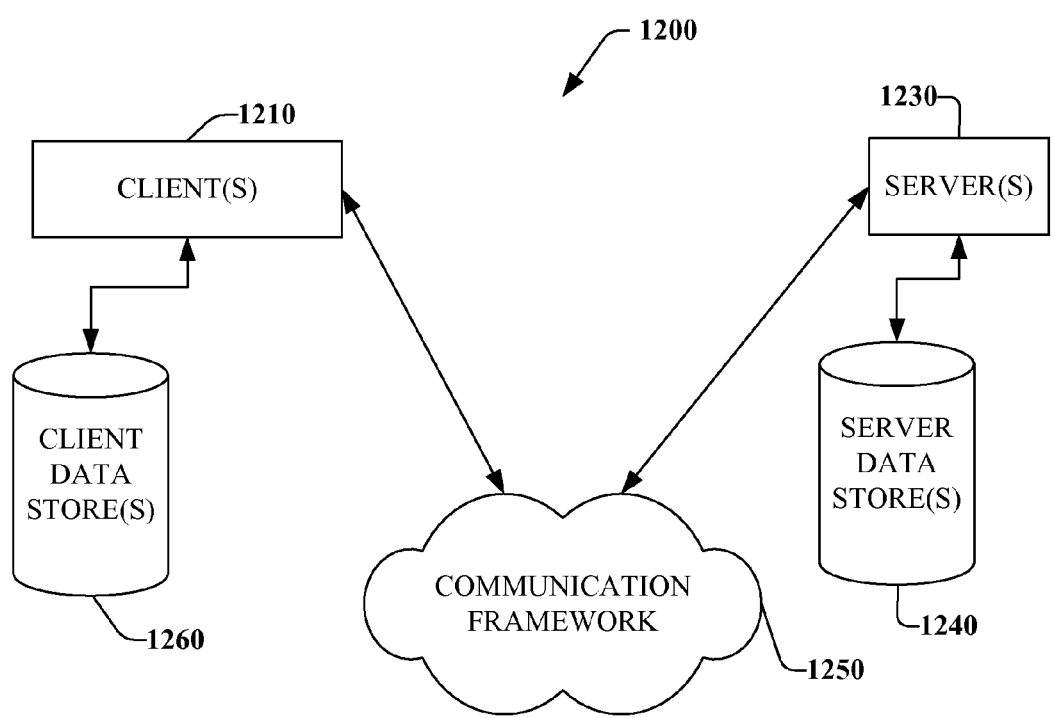
FIG. 12 is an example networking environment.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A human machine interface (HMI) device, comprising:
   a power recognition component that determines one or more power sources that are providing power to the HMI device, the one or more power sources are one or more of a host device providing power by way of a Universal Serial Bus connection, an AC power source, a DC power source, or a battery; and
   a selector component that automatically selects a subset of functionalities to enable with respect to the HMI device from amongst a plurality of possible functionalities based at least in part upon the determined one or more power sources providing power to the HMI device, the plurality of possible functionalities including at least a web server function that configures the HMI device to serve web pages to a host device, a backlight function that powers backlighting for an interface associated with the HMI device, and a maintenance function that enables installation and configuration of an HMI application.

2. The HMI device of claim 1, the selector component selects the subset of functionalities to configure the HMI device to act as a storage class device if the power recognition component determines that the HMI device is being provided power solely from a host device via a USB connection, wherein configuring the HMI device to act as a storage class device entails providing power to CPU and memory subsystems of the HMI device while withholding power to a backlight of the HMI device.

3. The HMI device of claim 1, the selector component selects the subset of functionalities to configure the HMI device to act as a remote web server if the power recognition component determines that the HMI device is being provided power solely via a USB connection, wherein acting as a remote web server enables the HMI device to serve web pages to a host device.

4. The HMI device of claim 1, the power recognition component determines that power is being provided to the HMI device from a plurality of power sources and identifies the plurality of power sources, the selector component automatically selects the subset of functionalities to enable based at least in part upon the identities of the plurality of power sources.

5. The HMI device of claim 1, further comprising a power provider component that selectively provides power to hardware of the HMI device based at least in part upon the selected subset of functionalities.

6. The HMI device of claim 5, the power provider component comprises at least one of a transistor, a relay, a MEMS, or a power ORing device.

7. The portable device of claim 1, further comprising a security component that determines whether a user is authorized to utilize the subset of functionalities selected by the selector component.

8. The HMI device of claim 7, the security component determines an identity of the user and accesses a data store to determine a role of the user based at least in part upon the identity, the selector component selects the subset of functionalities based at least in part upon the determined identity and the determined one or more power sources providing power to the HMI device.

9. The HMI device of claim 7, the security component accesses a data store and determines a role associated with the identified user, the selector component selects the subset of functionalities based at least in part upon the determined role and the determined one or more power sources providing power to the HMI device.

10. The HMI device of claim 1, further comprising a sensor component that senses contextual data, the selector component selects the subset of functionalities based at least in part upon the sensed contextual data and the determined one or more power sources providing power to the HMI device.

11. The HMI device of claim 10, the contextual data includes one or more of geographic position of the HMI device, orientation of the HMI device, time of day, day of week, or time of year.

12. The HMI device of claim 1, one or more drivers are initiated based at least in part upon the determined one or more power sources.

13. The HMI device of claim 12, the one or more drivers are located within a host device connected to the HMI device and initiated by the selector component.

14. The HMI device of claim 1 being a portable HMI device.

15. A method for configuring a human machine interface (HMI) device, comprising:
   identifying one or more power sources providing power to the HMI device, the one or more power sources being at least one of a host device that provides power to the HMI device by way of a USB, an AC power source, a DC power source, or a battery; and selectively enabling at least one functionality of the HMI device from a set of selectable functionalities based at least in part upon the identification of the one or more power sources, the set of selectable functionalities including at least a web server functionality that configures the HMI device to serve web pages to a host device, a backlighting functionality that enables a backlight for an interface associated with the HMI device, and a maintenance function that enables installation and configuration of an HMI application on the HMI device.

16. The method of claim 15, further comprising providing power to selected portions of hardware to enable the at least one functionality.

17. The method of claim 15, the enabled at least one functionality facilitates utilization of the HMI device as a storage class device, wherein utilization as a storage class device causes power to be provided to a CPU subsystem and a memory subsystem of the HMI device, and causes power to be withheld from the backlight associated with the interface of the HMI device.

18. The method of claim 15, further comprising:
selecting a subset of drivers from a set of available drivers based on the identification of the one or more power sources; and
initiating the selected subset of drivers.

19. The method of claim 15, further comprising:
determining an identity of a user of the HMI device; and
selectively enabling the at least one functionality based at least in part upon the identification of the user and the identified one or more power sources.

20. The method of claim 19, further comprising:
sensing contextual data; and
selectively enabling the functionality based at least in part upon the sensed contextual data and the identified one or more power sources.

21. A human machine interface (HMI) device, comprising:
means for identifying which of a universal serial bus (USB) connected host device, an AC power source, a DC power source, or a battery is providing power to the HMI device; and
means for selectively enabling, based at least on the identification, at least one function from a set of available HMI functions, the set of available HMI functions including at least a web server function that configures the HMI device to serve web pages to a host device, a backlighting functional that enables a backlight for an interface associated with the HMI device, and a maintenance functionality that enables installation and configuration of an HMI application on an HMI device.

* * * * *

UNITED STATES PATENT AND TRADEMARK OFFICE
CERTIFICATE OF CORRECTION

| | | |
|---|---|---|
| PATENT NO. | : 7,644,295 B1 | Page 1 of 1 |
| APPLICATION NO. | : 11/426545 | |
| DATED | : January 5, 2010 | |
| INVENTOR(S) | : Dotson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Sixteenth Day of November, 2010

David J. Kappos
*Director of the United States Patent and Trademark Office*